United States Patent [19]

Hagan

[11] Patent Number: 5,267,306
[45] Date of Patent: Nov. 30, 1993

[54] TELEPHONE APPARATUS WITH CONDITIONAL OPERATION

[76] Inventor: Clay E. Hagan, 2607 Lancelot Dr., Huntsville, Ala. 35803

[21] Appl. No.: 687,565

[22] Filed: Apr. 19, 1991

[51] Int. Cl.[5] .............................................. H04M 1/00
[52] U.S. Cl. ................................. 379/352; 379/183; 379/160; 379/165
[58] Field of Search ............... 379/352, 156, 157, 159, 379/160, 161, 165, 183

[56] References Cited

U.S. PATENT DOCUMENTS

| | | | |
|---|---|---|---|
| 4,636,589 | 1/1987 | Lee | 379/159 |
| 4,754,476 | 6/1988 | Rasmussen et al. | 379/159 |
| 4,769,837 | 9/1988 | McCormick et al. | 379/160 X |
| 4,893,334 | 1/1990 | Parnello | 379/157 |

*Primary Examiner*—James L. Dwyer
*Assistant Examiner*—Paul A. Fournier
*Attorney, Agent, or Firm*—John C. Garvin, Jr.; Harold W. Hilton

[57] ABSTRACT

A dial controllable conditionally operative device which is directly connectable to the ring and tip lines of a subscriber loop. "On-hook" coupling is provided to allow the device to provide the conditional operation of one or more of the functional capabilities of a standard telephone. The device is usable in parallel with at least one standard telephone to provide a controlled telephone system. The device may also be usable in an intercommunication system using the ring and tip lines of the subscriber loop.

25 Claims, 14 Drawing Sheets

TELEPHONE APPARATUS WITH CONDITIONAL OPERATION

FIELD OF THE INVENTION

The present invention relates in general to telephones, and, more particularly, to such telephone system devices which have certain nonexistent or conditionally operative functions.

BACKGROUND OF THE INVENTION

A problem encountered in a typical home having a small child or small children therein is that the child perceives the telephone set as a toy and plays with the telephone thus disrupting service to the remaining telephones on the subscriber loop. Even when the child progresses past the "playing" stage, the child still tends to treat the telephone in an irresponsible manner. Thus, most parents do not even consider placing a telephone in a child's room until the child is mature enough to handle the responsibilities of a full feature telephone.

Small children generally do not possess the maturity necessary to handle the responsibility of dialing and most parents do not feel comfortable about their child dialing long distance or toll calls (e.g. 1-900-...). In such cases a child's telephone should not allow the child to place long distance or toll calls without parental approval. Therefore, the ability to establish external communications should be conditional or nonexistent.

A child might forget to place the telephone back "on-hook" after use. Since it is possible to disable a subscriber loop by leaving it in an "off-hook" condition, the subscriber may not feel comfortable with allowing unsupervised access to a telephone which can establish and/or maintain the subscriber loop in an "off-hook" condition. Thus, the "off-hook" function should be conditional or nonexistent.

A ringing telephone might wake a napping child. Furthermore, if the "off-hook" function is not enabled on the conditionally operative telephone, then it would not possess the answer means. Thus, the ringer should be conditional or nonexistent.

If the conditionally operative telephone is to be used primarily by small children, then the handset should be smaller than a standard telephone to fit the child's head.

The present invention provides customized conditionally operative telephones used in conjunction with standard telephones to meet the needs of the end user (in the above example—a child) and to satisfy the concerns of the subscriber.

A standard telephone contains the following enumerated functional capabilities. The following list will hereinafter be referred to "the thirteen enumerated functional capabilities of a standard telephone".

1) "off-hook" function. The telephone company defines an "off-hook" status as the detection of a subscriber loop current above a certain predefined threshold. A standard telephone can place the subscriber loop into an "off-hook" status. This is typically done by completing the subscriber loop circuit through a sufficiently small impedance so as to allow a sufficiently large subscriber loop current. A typical telephone uses a switch hook to engage the "off-hook" status when the handset is lifted.

2) "on-hook" function. If the subscriber loop current is below the "off-hook" threshold current, then the telephone company identifies the subscriber loop as being in the "on-hook" status. The only action taken by the telephone company while the subscriber loop is in an "on-hook" condition is to send a ringing signal to indicate an incoming call. A typical telephone will open the subscriber loop circuit (except a small leakage current) when the handset is placed on the switch hook to provide the "on-hook" means.

3) Dialing function. In order to place a call, a telephone must provide the telephone company with a series of numbers to identify the telephone to be called. Each number is transmitted by either a make-break pulse sequence or a touch tone signal.

4) Ringing function. In order to indicate an incoming call, the telephone company will place a ringing signal on the subscriber loop. A typical telephone rings a bell or sounds a buzzer while the telephone is "on-hook" to indicate the presence of a ringer signal.

5) Sound transmission function. In order to communicate with other telephone users, a telephone must have the means to convert audible sound into electrical signals suitable for telephone system transmission. A microphone with associated amplifier circuitry typically is used to provide the sound transmission means.

6) Sound reception function. Conversion of suitable electrical signals from the subscriber loop into a speaker form a typical means of sound reception.

7) Dial tone indication function. When the telephone company desires to indicate to the subscriber loop that the telephone company is ready to receive a telephone number, the telephone company will place a dial tone signal on the subscriber loop. A typical telephone allows the sound reception means to provide the dial tone to the earpiece.

8) Status indication function. Audible signals are sent by the telephone company to indicate the status of a call (ringing, busy, ...). A typical telephone allows the sound reception means to provide the status indication signals to the earpiece.

9) Data generation and transmission function. Data is typically transmitted by the use of tones which are in the audible spectrum. Make-break pulse sequences may also be used for data transmission. Mechanical or electrical means may be provided for data generation and transmission. Use of a dialing means during a telephone conversation can provide the data generation and transmission function.

10) "hang-up" function. In order to terminate a telephone call, a user must place his subscriber loop in the "on-hook" status (i.e. hang up). Thus the "hang-up" means is normally equivalent to the "on-hook" means.

11) Answer function. In order to answer an incoming call, a user must place his subscriber loop in the "off-hook" status. Thus the answer means is normally equivalent to the "off-hook" means.

12) Call maintenance function. In order to maintain a telephone call the subscriber loop must remain in the "off-hook" condition. Thus the call maintenance means is typically equivalent to the "off-hook" means.

13) Data reception function. A standard telephone does not contain data reception equipment other than the sound reception means as described in (6).

Establishing a standard telephone as an apparatus which contains these thirteen enumerated functions as described herein, allows the framework to be defined from which a conditional operation telephone may be conceived. A standard telephone is designed to meet the needs of responsible adult users. Each conditional operation telephone will be designed to meet the needs of a certain class of telephone users as granted by the subscriber. Thus a subscriber can grant limited use of the telephone system under certain desired conditions to every class of telephone users.

DESCRIPTION OF THE PRIOR ART

Unauthorized use of the telephone results in losses to business, government and to the telephone company which are extremely large. Thus, it is not surprising that much prior art exists for the prevention of an unauthorized person from placing an unauthorized call. Prior art U.S. Pat. Nos. in this area of which I am aware include: U.S. Pat. No. 2,372,262; 3,284,578; 3,513,271; 3,757,055; 3,851,109; 3,872,260; 3,973,083; 4,234,764; 4,297,534 and 4,081.614.

The Edwards et al. patent (U.S. Pat. No. 2,372,262) teaches the use of a shunt impedance across the rotary dial contacts to disable the dialing operation of the telephone. The shunt impedance is conditionally connected across the rotary dial contacts by a mechanical key and lock apparatus. Thus, when so connected, no calls (local or long distance) can be made using the rotary dial. It is important to note that an apparatus employing the teachings of U.S. Pat. No. 2,372,262 will pull "off-hook" current when the handset is lifted from the cradle. Thus, a Touch Tone signal generator can be placed near the mouth piece to make a call if the central office will accept touch tone calls.

The Evans patent (U.S. Pat. No. 3,284,578) also deals with rotary dial systems. It teaches the use of an electro-mechanical device to lock the dial mechanism. The dial mechanism is locked if the system detects the second digit to be "0" or "1". Thus, it only deals with long distance call prevention. It does not address "off-hook" current in the application of the patent. It can also be easily defeated by a Touch Tone signal generator placed near the mouth piece.

The Stathacopoulos patent (U.S. Pat. No. 3,513,271) teaches the use of circuitry which disables the telephone if the first digit dialed is a "0" or a "1". This long distance disabling system is conditionally activated by a manual key. It only deals with long distance call prevention.

The McCann et al. patent (U.S. Pat. No. 3,757,055) teaches the use of a counting circuit to count the number of digits dialed and cause the telephone lines to be opened when that count reaches eight. It also teaches the use of a circuit which causes the telephone line to open whenever the digit "0" is among the first three digits dialed. It only deals with long distance call prevention.

The Downs et al. patent (U.S. Pat. No. 3,851,109) teaches the use of a system which interrogates dialed digits to determine if the dialed sequence is to be allowed or disallowed as a function of pre-programmed instructions. Thus, this patent allows the prevention of certain pre-programmed local and long distance calls.

The Oatis patent (U.S. Pat. No. 3,872,260) teaches the use of an apparatus which disconnects the telephone if the number detected is pre-programmed to be disallowed. The number detection means detects pulses derived from the make and break of the rotary dial contacts.

The Sekiguchi patent (U.S. Pat. No. 3,973,083) teaches a means to disable the telephone if the first number dialed is "0" or the first or second numbers are "1". Thus, it only deals with long distance call prevention.

The Beebe patent (U.S. Pat No. 4,234,764) teaches the disconnection of the telephone for a pre-determined time if a "0" or "1" is detected as the first digit dialed. During this time, an authorized user may input a three-digit security code to the telephone in a pre-determined sequence within a pre-determined time in order to reconnect the telephone so the long distance phone call can be completed.

The Epstein et al. patent (U.S. Pat. No. 4,297,534) teaches the use of a frequency signal altering circuit to prevent the successful completion of a call. The frequency signal altering circuit is activated when certain pre-programmed numbers are dialed.

Additionally, the Dahlquist et al. patent (U.S. Pat No. 4,081,614) teaches a means by which to design an administrative telephone system such that a single administration telephone can service one, two or more staff telephones. It is addressed towards businesses which desire to utilize a receptionist or an administrator to assist staff members in the effective inter-business use of the telephone system. This type of system requires a special network to connect the staff telephones to a central control center at which the administrator must apply direct control over all intercommunication between the staff telephones.

SUMMARY OF THE INVENTION

Specific embodiments of a conditionally operative telephone device are described. One embodiment is a telephone device comprised of a communications network (sound reception and sound transmission means) which is AC coupled to the subscriber loop. A new and unexpected result occurs when two or more of these embodiments are connected to the same subscriber loop. This new and unexpected result is the ability for two or more of these embodiments to communicate with each other without the telephone company declaring the subscriber loop "off-hook". Since the subscriber loop is declared as "on-hook", telephone calls may be received and/or placed by a standard telephone on the subscriber loop even with these conditionally operative telephones in use.

The above embodiment is AC coupled to the subscriber loop. However, this general class of conditional operation devices will hereafter be referred to as "on-hook" coupled devices. "On-hook" coupled devices include all devices that do not place the subscriber loop into an "off-hook" condition in order to receive and/or transmit sound and/or data.

A standard telephone can perform all of its normal functions while one, two or more "on-hook" coupled communication networks are active on the subscriber loop. However, it may not be desirable to allow small children to listen to and/or participate in all adult telephone conversations. Therefore, it is desirable to place conditions upon the ability of the communications network to exist as "on-hook" coupled on the subscriber loop. Furthermore, it is desirable to communicate the allowable functionality from a standard telephone.

Data generation and transmission is normally implemented by the dialing means on a standard telephone. Therefore, to respond to commands generated by a standard telephone, it is desirable for some conditionally operative embodiments to contain telephone number decoders. A telephone which has introduced a telephone number decoder for the express purpose of receiving commands from a standard telephone dialer, so that additional circuitry can implement the elimination, enhancement and/or restriction of one, two or more of the thirteen enumerated functional capabilities of a standard telephone will hereafter be referred to as a "dial controllable conditionally operative telephone".

It is, therefore, an object of the present invention to provide a telephone device which has a customized set of functional capabilities of a standard telephone.

Another object of the present invention is to provide a telephone set which is designed to have an "on-hook" coupled communications network.

It is yet another object of the present invention to provide a telephone set which is a "dial controllable conditionally operative telephone".

These together with other objects and advantages which will become subsequently apparent reside in the details of construction and operation as more fully hereinafter described and claimed, reference being had to the accompanying drawings forming part hereof, wherein like reference numerals refer to like parts throughout.

DETAILED DESCRIPTION OF THE INVENTION

Figure 1:
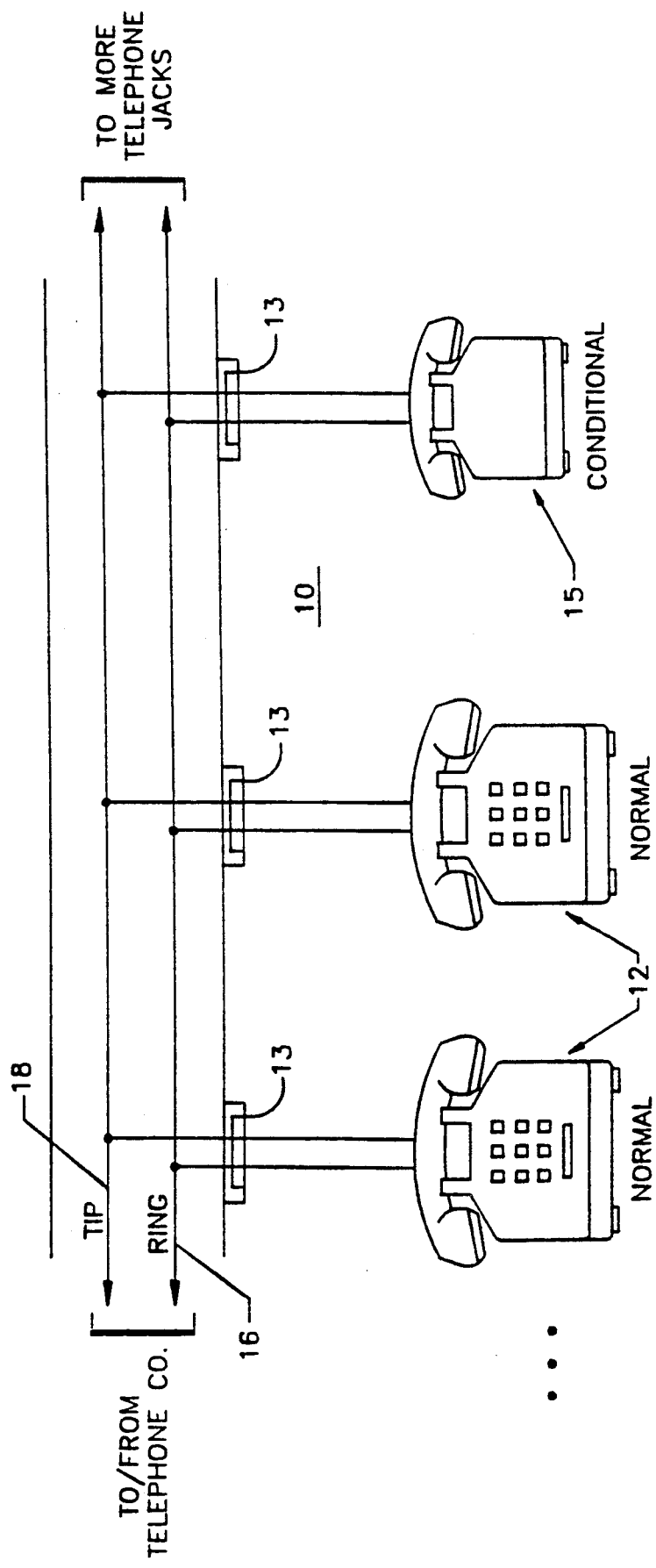
FIG. 1 illustrates a typical home telephone system having a plurality of standard telephones and a single conditionally operative telephone interconnected.
Figure 2:
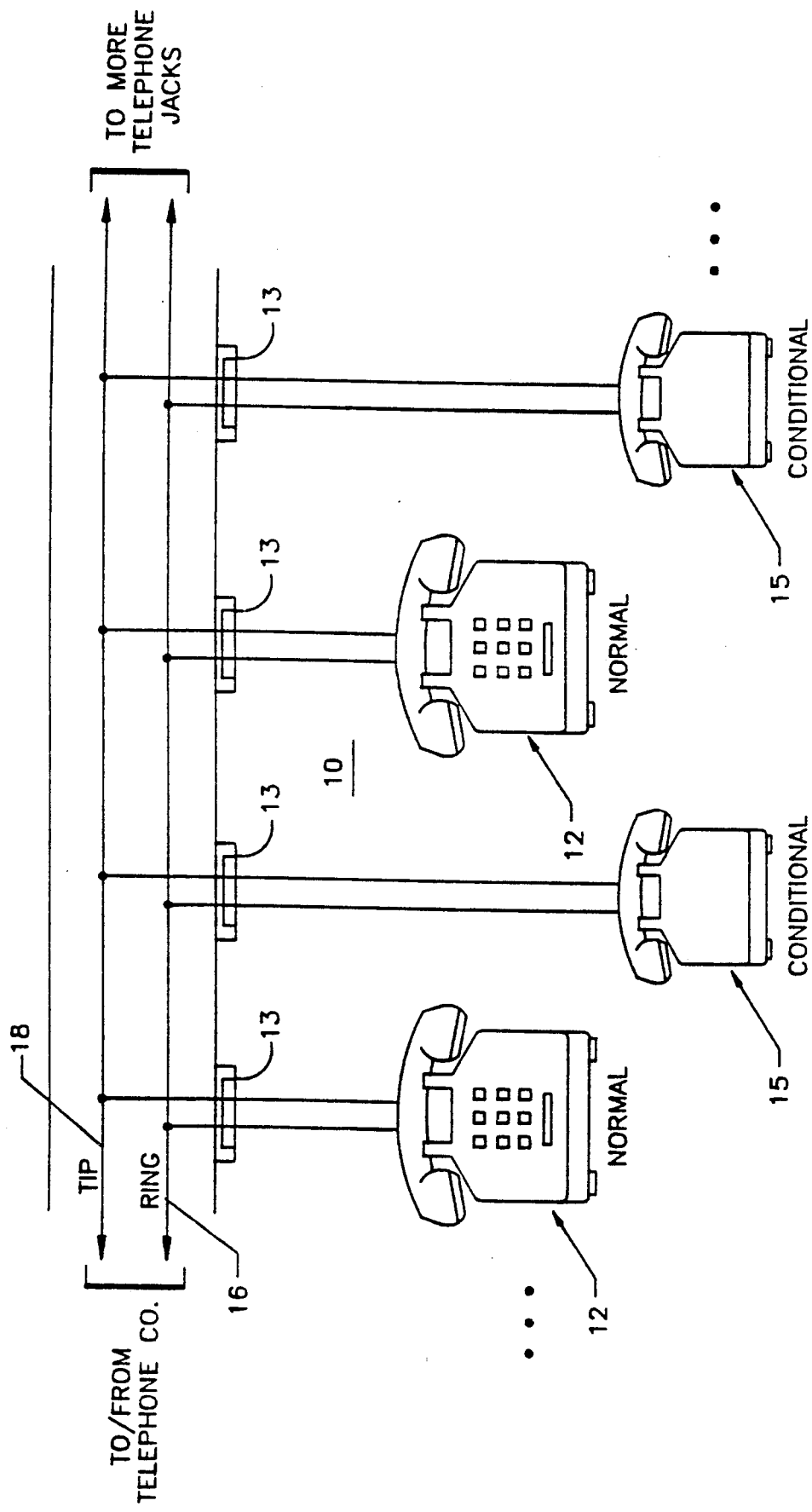
FIG. 2 illustrates a typical home telephone system having a plurality of standard telephones and a plurality of conditionally operative telephones interconnected.

As seen in FIG. 1 and FIG. 2, a telephone system 10 is shown to include one or more "normal" telephones 12 (i.e. telephones as would normally be found in the home) and one or more conditionally operative telephones 15 disposed for operation in accordance with the principals of the present invention. As can be seen, no special wiring is required in the use or installation of the conditionally operative telephones. Also, a typical telephone jack 13 is used for both the normal and conditionally operative telephones.

As can be seen in FIG. 1 and FIG. 2, each telephone is wired in a parallel configuration. Thus when any normal telephone 12 is "off-hook", sufficient current will flow between the ring and tip wires 16 and 18 to meet the subscriber loop "off-hook" requirements. This ability of a normal telephone 12 to place the subscriber loop in an "off-hook" condition is independent of any other telephone since the telephones are wired in parallel.

As further shown in FIG. 1 and FIG. 2, all telephones have access to the ring and tip wires 16 and 18 due to the parallel wiring configuration. Thus, the most convenient means of communication between the telephones will be through the ring and tips wires 16 and 18. Thus, it is desired to provide a means for a normal telephone 12 to communicate (both voice and data) with a conditionally operative telephone 15 via the ring and tip wires 16 and 18. Furthermore, via the ring and tip wires 16 and 18 it is desired to provide a means for a conditionally operative telephone 15 to communicate with a normal telephone 12 on the same subscriber loop and other telephones which are connected through the telephone company. The preferred embodiments will require no modifications to the normal telephones 12.

Figure 3:
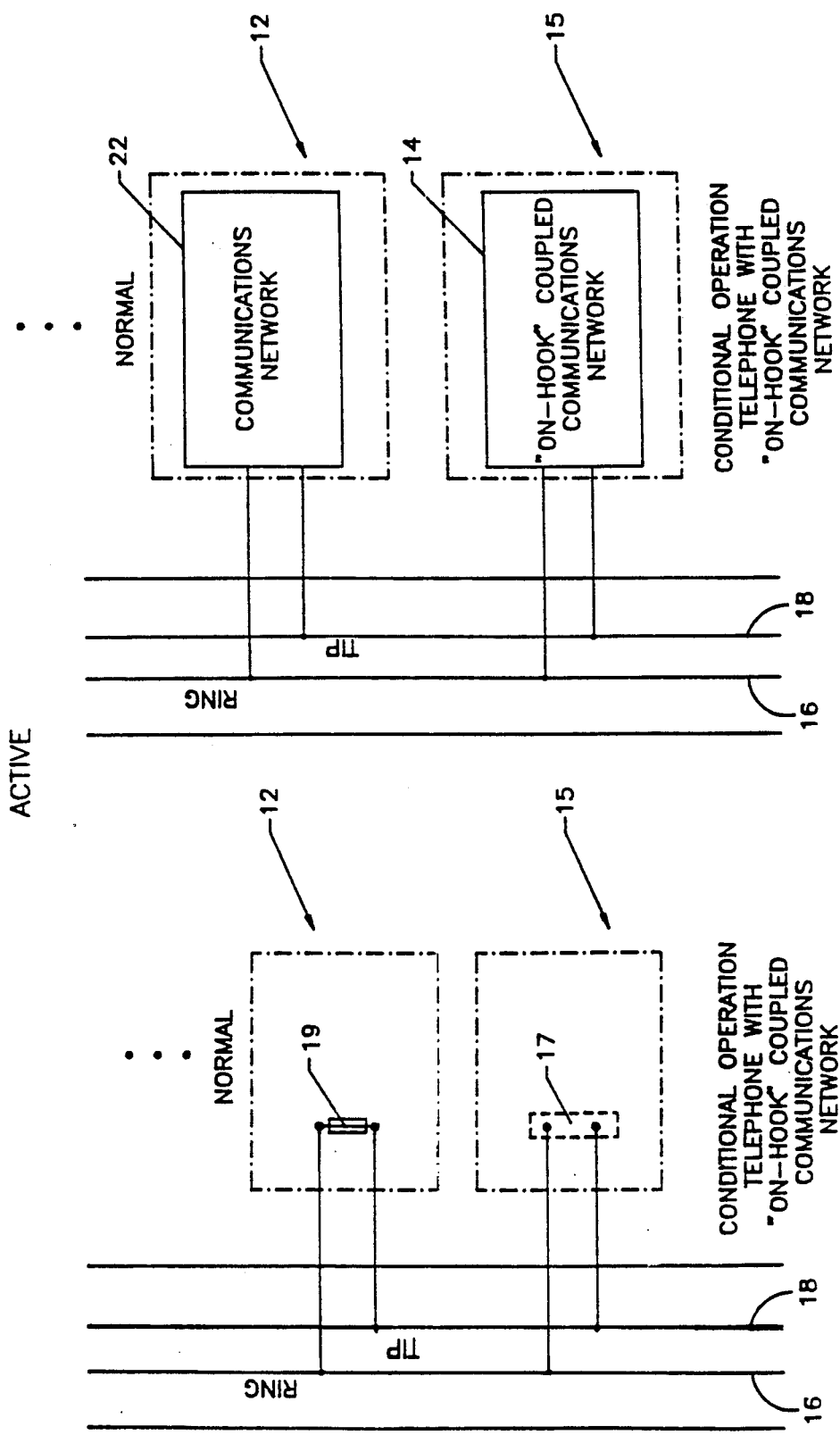
FIGS. 3a and 3b are diagrammatic views of the system of FIG. 2 with each telephone active handset lifted).

FIG. 3a illustrates one normal telephone 12 and one conditionally operative telephone 15 in an active condition (e.g. handset lifted) for the system shown in FIG. 1 or FIG. 2 from an "off-hook" condition perspective. For the normal telephone 12 the equivalent impedance load 19 shown carried in the telephone 12 is sufficiently small to allow "off-hook" current to flow between the ring and tip wires 16 and 18. The equivalent impedance load 17 shown carried in the conditionally operative telephone 15 is sufficiently large to not allow "off-hook" current to flow between the ring and tip wires 16 and 18. Thus, the conditionally operative telephone 15 can not place the subscriber loop into an "off-hook" condition.

FIG. 3b illustrates one normal telephone 12 and one conditionally operative telephone 15 with an "on-hook" coupled communications network 14 in an active condition (e.g. handset lifted) for the system shown in FIG. 1 or FIG. 2 from a communications perspective. The normal telephone 12 has connected its communications network 22 to the ring and tip wires 16 and 18. The conditionally operative telephone 15 has also connected its communications network 14 to the ring and tip wires 16 and 18. Furthermore, the normal telephone 12 and the conditionally operative telephone 15 can communicate with each other via the ring and tip wires 16 and 18.

Figure 4:
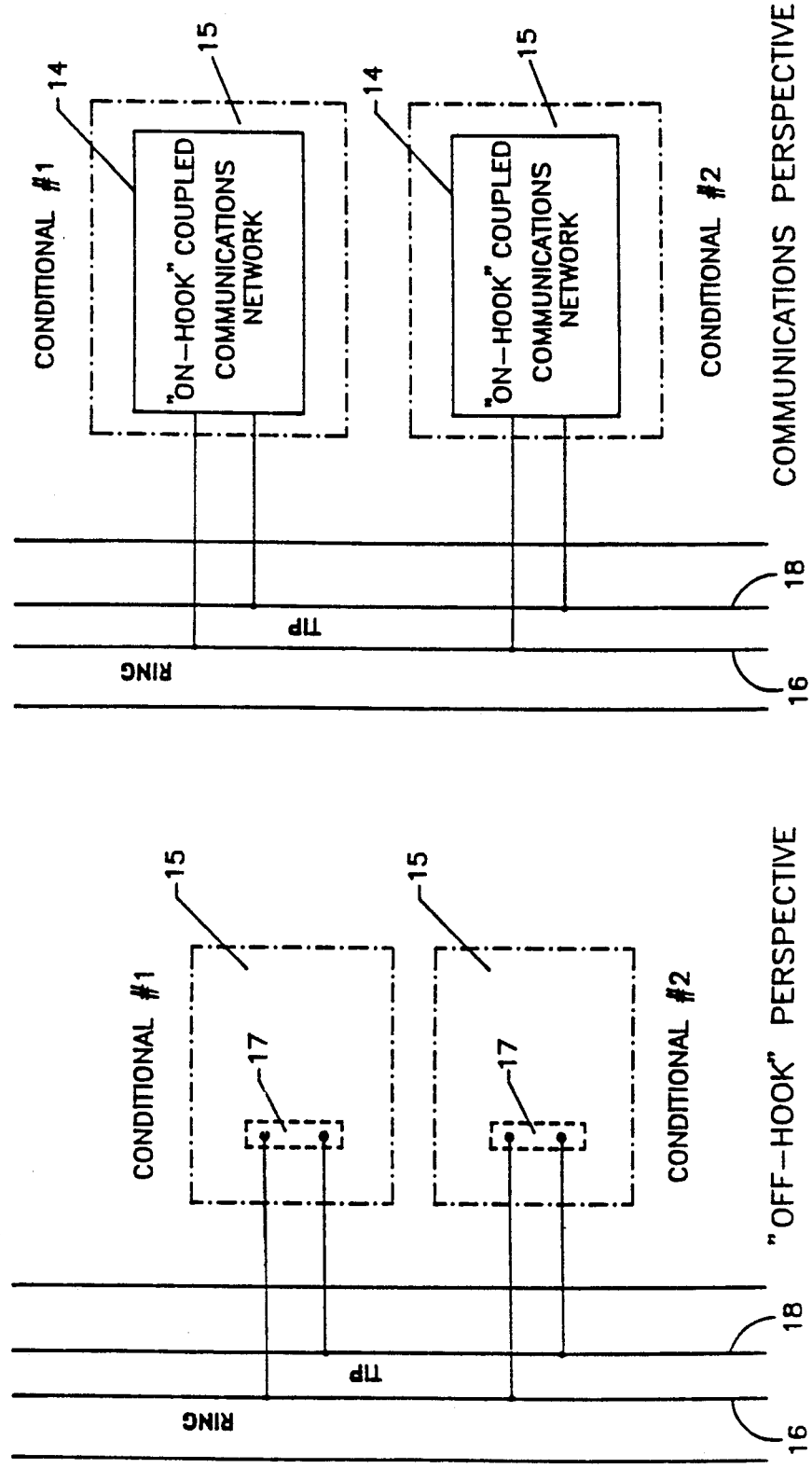
FIGS. 4a and 4b are diagrammatic views illustrating the active condition (e.g. handset lifted) of the conditionally operative telephones of the system of FIG. 2.

FIG. 4a illustrates two active (e.g. handset lifted) conditionally operative telephones 15 for the system shown in FIG. 2 from an "off-hook" condition perspective. As discussed with FIG. 3a the equivalent load impedance 17 of the conditionally operative telephone 15 is sufficiently large to not allow "off-hook" current to flow between the ring and tip wires 16 and 18. However, an additional point must be made about FIG. 4a. Some current may flow between the ring and tip wires 16 and 18 through the equivalent load impedance 17. If more than one conditionally operative telephone 15 is active on a subscriber loop, and it is desired that the plurality of these conditionally operative telephones 15 not be allowed to place the subscriber loop into an "off-hook" condition, then it is required that the parallel combination of the equivalent load impedances 17 be sufficiently large so as to prevent "off-hook" current from flowing between the ring and tip wires 16 and 18. If two identical conditionally operative telephones 15 are active and the subscriber loop remains in an "on-hook" condition then that conditionally operative telephone embodiment will be said to have an "on-hook" coupling factor of ½. Furthermore, if n identical conditionally operative telephones 15 are active and the subscriber loop remains in an "on-hook" condition then that conditionally operative telephone embodiment will be said to have an "on-hook" coupling factor of 1/n. In order for a plurality of conditionally operative telephones 15 to act as "on-hook" coupled while all of the plurality are active, the total sum of the "on-hook" coupling factors must be less than one.

FIG. 4b illustrates two conditionally operative telephones 15 with "on-hook" coupled communication networks 14 in an active condition (e.g. handset lifted) for the system shown in FIG. 2 from a communications perspective. Each conditionally operative telephone 15 has connected its communications network 14 to the ring and tip wires 16 and 18. Thus, each is able to send and receive suitable communications. Therefore, the conditionally operative telephones 15 can communicate with each other while the subscriber loop is in an "on-hook" condition. The ability for two telephones to communicate with each other while the subscriber loop is in an "on-hook" condition is a new and unexpected result. These communications can be performed without the assistance or knowledge of the telephone company and, thus, may form an inter-house intercom system. FIG. 4b only shows two conditionally operative telephones 15, however, a plurality of conditionally operative telephones 15 will exhibit these same abilities providing the total sum of the "on-hook" coupling factors is less than one.

Figure 5:
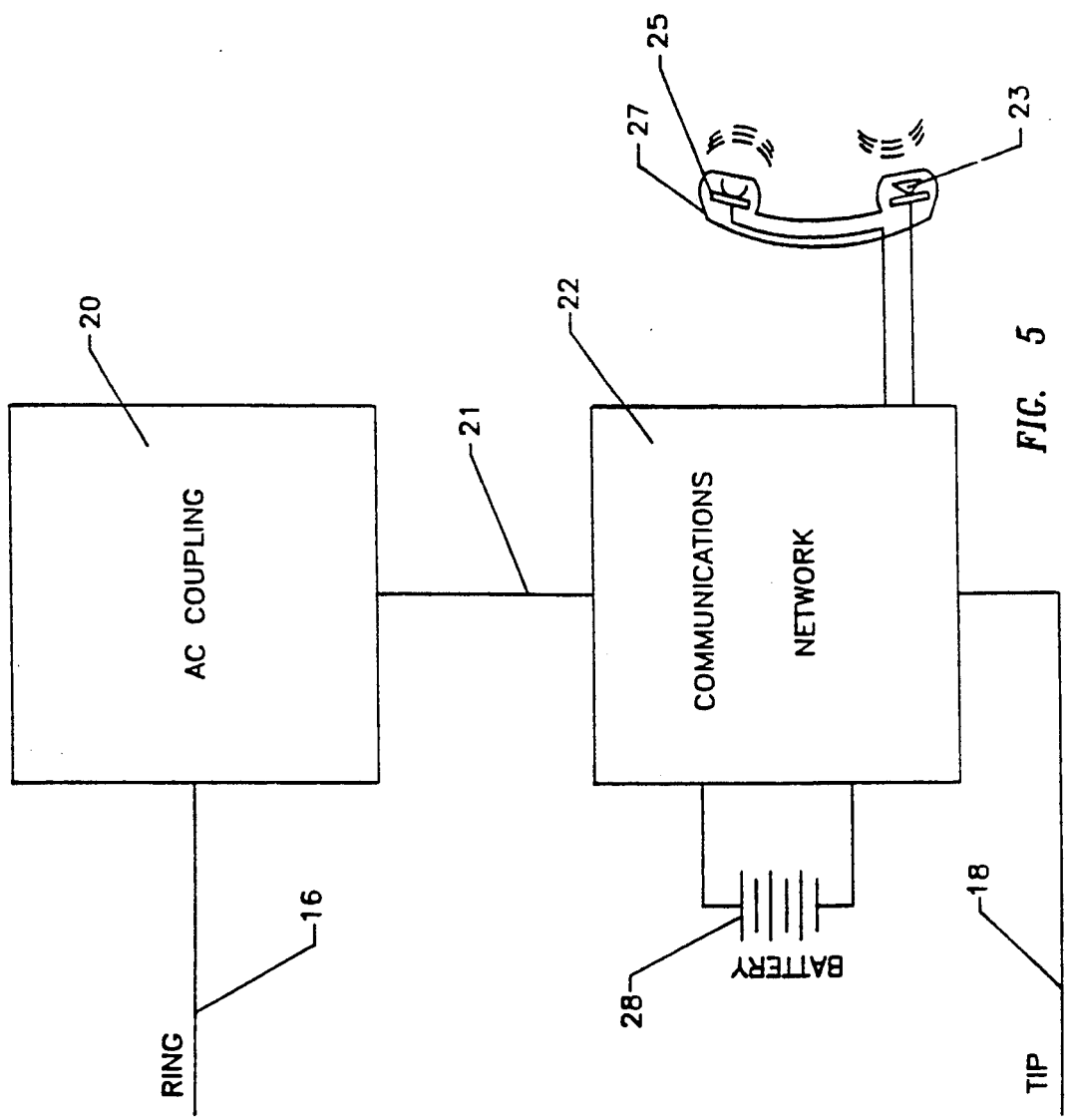
FIG. 5 is a block diagram of an AC coupled communications network as used in the present invention.

FIG. 5 is a block diagram of an AC coupled communications network as used in the present invention. AC coupling will provide a near zero "on-hook" coupling factor. Thus, AC coupling is the best form of "on-hook" coupling according to the "on-hook" coupling factor. As can be seen, an AC coupling 20 is provided between the ring wire 16 and the communications network 22 by connecting wire 21. Power is provided to the communications network 22 by the connection of a battery 28. Other sources of power, including line power will be presented in upcoming figures. The microphone 23 and the speaker 25 are part of the communications network 22 and are shown in FIG. 5 as residing in the handset 27. The communications network 22 may have many different configurations and the communications network 22 of FIG. 6 is illustrative of one such network.

Figure 6:
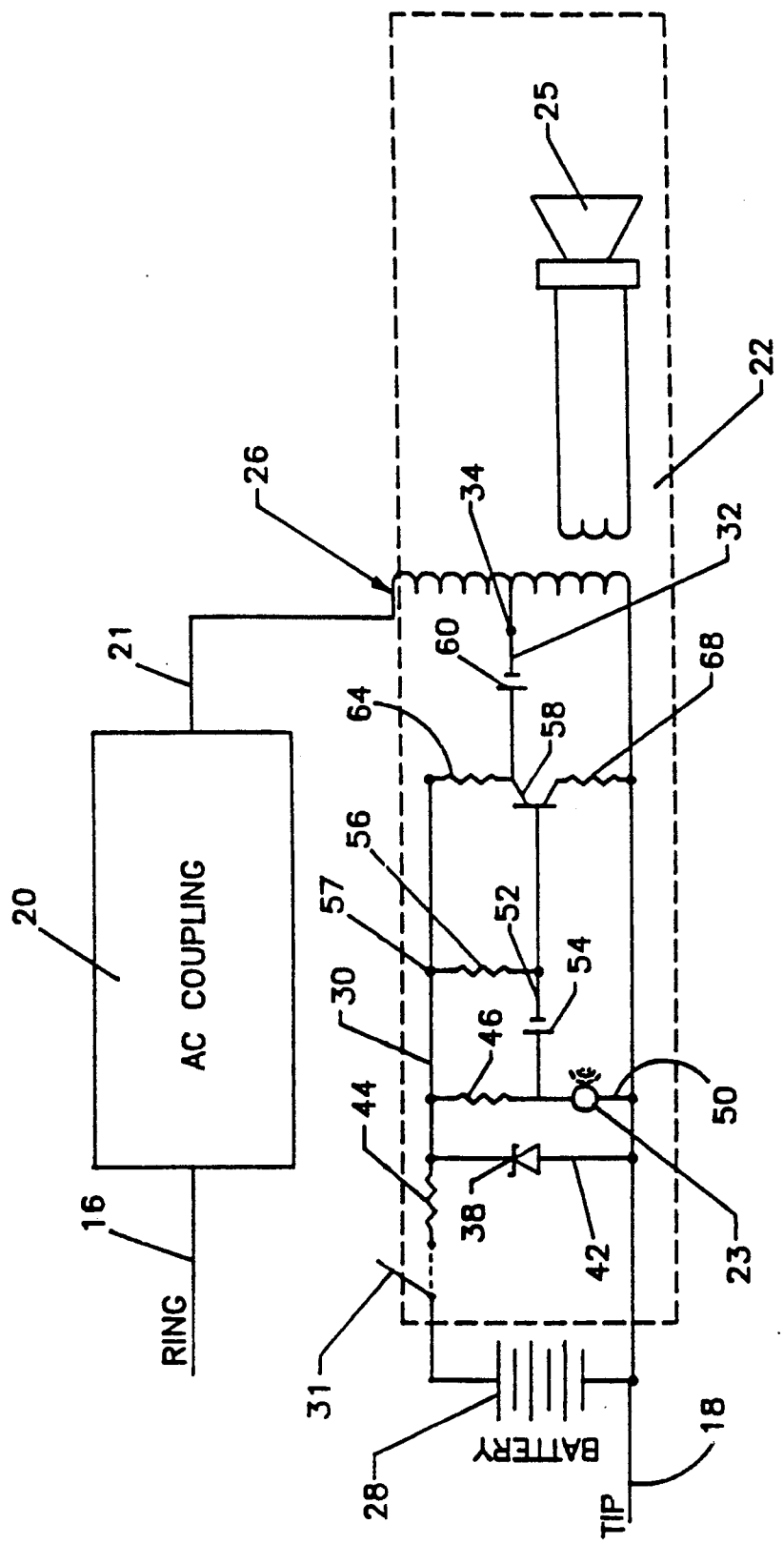
FIG. 6 is a schematic illustration of a conditionally operative telephone of the present invention which has an "on-hook" coupled communications network via AC coupling.

FIG. 6 illustrates one configuration of the communications network 22 which was shown in block diagram form in FIG. 5. As can be seen, the network 22 connects to the positive terminal of the battery 28 to line 30 through the switch 31. When the telephone is active the switch 31 is closed and when the telephone is inactive the switch 31 is open to conserve the battery 28. A zener diode 38 is connected in a line 42 between lines 30 and 18. This zener diode 38 is used to maintain a reference voltage between lines 30 and 18 in order to provide biasing current for the microphone 23 and the transistor 58. A resistor 44 is connected in a line 30 between the battery 28 and line 42. This resistor 44 is used to reduce the current drawn from the battery 28 to a desired minimum level while maintaining acceptable communications network 22 operation performance. A resistor 46 and microphone 23 are connected in a line 50 across lines 18 and 30 in parallel with the zener diode 38. The flow of current through the resistor 46 and the microphone 23 will establish a voltage across the microphone 23 thus biasing it into its desired operating condition. A line 52 having a capacitor 54 therein is connected to line 50 between the resistor 46 and the microphone 23. The capacitor 54 is used to provide AC coupling between the microphone 23 and the transistor 58. A resistor 56 is provided between lines 30 and 52 between the base of the transistor 58 and the capacitor 54. Line 52 connects to the base of the transistor 58. The collector of the transistor 58 is connected to line 32 having a capacitor 60 therein. A resistor 64 is connected between lines 30 and 32 at the collector of transistor 58. A resistor 68 is provided between the emitter of the transistor 58 and the tip line 18. Resistors 56,64 and 68, capacitors 54 and 60, along with transistor 58 are chosen to provide acceptable amplification of the signal from the microphone 23 for presentation to the transformer 26. Transformer terminal 34 is connected to line 32. The primary winding of the transformer 26 is connected between line 21 and the tip line 18. The secondary winding of the transformer 26 is connected across the speaker 25. The characteristics of the transformer 26 are chosen to i) provide acceptable presentation of the communication signals to the subscriber loop, ii) provide acceptable reception of communication signals for output over the speaker, and iii) provide a portion of the microphone 23 signal to the speaker for user feedback.

Some features of the system shown in FIG. 6 are as follows:

1. "on-hook" coupled: Thus the subscriber loop will remain "on-hook" even if this telephone is active.
2. Dialing not allowed: In order to dial one must establish the subscriber loop in an "off-hook" condition. Thus, "on-hook" coupling prevents dialing. Also notice that no dialing means is used in this example.
3. Can not answer incoming calls: Another consequence of "on-hook" coupling.
4. Can not leave telephone system "off-hook": Another consequence of "on-hook" coupling. This feature is important since the user of this conditionally operative telephone can not disable the home telephone system.
5. Can participate in an external conversation only if a normal telephone is also used: The job of the normal telephone is to maintain the "off-hook" condition. Both the normal telephone and the conditionally operative telephone can talk and listen to the conversation.
6. Two units can talk to each other: Thus, two of these units can act as intercoms. The home telephone lines are used to pass AC coupled conversations without disabling the home telephone system from making or answering calls. If a telephone call comes in, then a standard telephone will have to answer the call even if one, two or more of these conditionally operative telephones are in use. Furthermore, a standard telephone is in no way hindered in making a call (dialing) while one, two or more of these conditionally operative telephones are in use. Also the telephone company is not impacted by the use of these conditionally operative telephones.

Figure 7A:
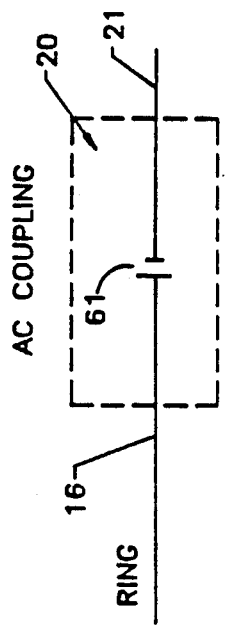
FIGS. 7a–7c illustrate several embodiments of the AC coupling shown in FIG. 5 and FIG. 6.
Figure 7B:
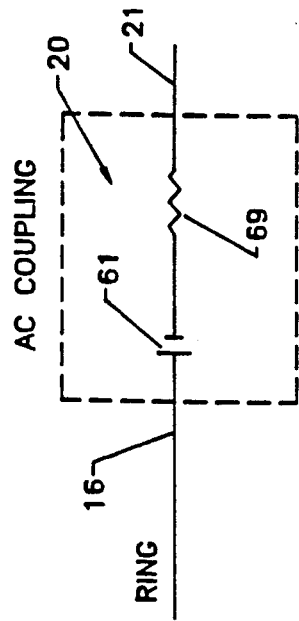
Figure 7C:
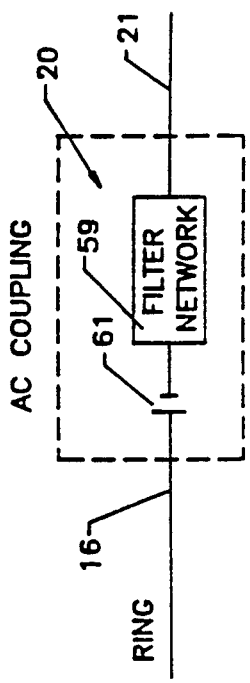

FIG. 7a–7c illustrate several embodiments of the AC coupling 20 shown in FIG. 5 and FIG. 6. FIG. 7a provides a capacitor 61 to connect line 21 with the ring line 16. This is the simplest form of AC coupling 20. A problem with the embodiment shown in FIG. 7a becomes apparent in the presence of a ringing signal on the subscriber loop. The equivalent load impedance will be the series combination of the capacitor 61 and the communications network 22 (see FIG. 5). The equivalent load impedance of the communications network 22 may be very low. Thus, most of the energy from the ringing signal may be absorbed by a conditionally operative telephone 15 which uses the AC coupling 20 embodiment shown in FIG. 7a. Therefore, standard telephones may not ring loud enough.

FIG. 7b overcomes the ringing signal problem by providing a resistor 69 in a line 21 between the capacitor 61 and the communications network 22 (see FIG. 5). The resistor 69 will thus provide a minimum load in the presence of AC signals. The value of the resistor 69 is chosen so as to make sure that ringer equivalence number (REN) is sufficient to allow acceptable ringing signal energy to reach the standard telephones.

FIG. 7c illustrates that a filter network 59 may also be used to overcome the ringing signal problem as well as reduce high and low frequency noise.

The necessary power for the embodiments shown in FIG. 5 and FIG. 6 was supplied by a battery 28. It may not be desirable to place a battery in a conditionally operative telephone. Obviously, power could be provided by the DC conversion of home AC power. However, this would produce additional expense and make the telephone dependent on AC power. This may not be a desirable alternative to battery power. Telephone line power is available from the ring and tip lines 16 and 18.

Figure 8A:
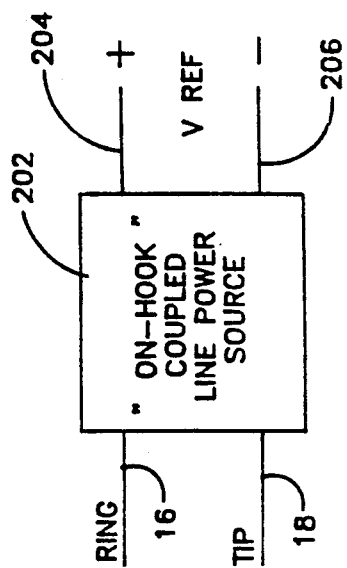
FIGS. 8a and 8b are diagrammatic illustrations of an "on-hook" coupled line power source.

FIG. 8a is a block diagram of an "on-hook" coupled line power source 202. The "on-hook" coupled line power source 202 provides a reference voltage across the lines 204 and 206 while not allowing the current between the ring and tip wires 16 and 18 to exceed the "on-hook" condition. It should be noted that the use of an "on-hook" coupled line power source 202 to replace the battery 28 in FIG. 5 will result in an "on-hook" coupled embodiment since some DC current must flow to provide power. The "on-hook" coupled line power source 202 may have many different configurations and the "on-hook" coupled line power source 202 of FIG. 8b is illustrative of one such configuration.

Figure 8B:
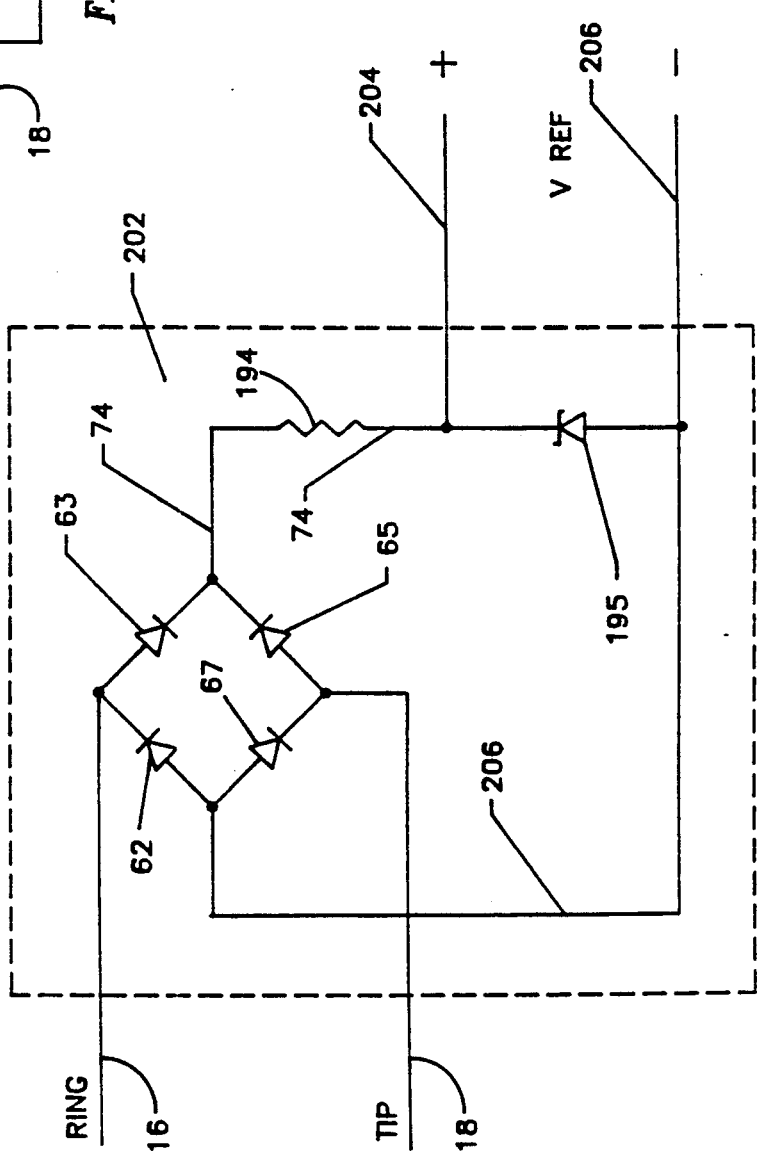

FIG. 8b illustrates one configuration of the "on-hook" coupled line power source 202 which was shown in FIG. 8a. As can be seen, a diode bridge comprised of diodes 62, 63, 65 and 67 is connected to the input lines 16 and 18 and the output lines 74 and 206. A resistor 194 and a Zener diode 195 are connected in line 74. The resistor 194 is chosen to provide an equivalent load impedance high enough to limit the current between the ring and tip lines 16 and 18 to values within the "on-hook" condition. The zener diode 195 then provides a stable output reference voltage so long as the current requirement between 204 and 206 does not exceed the maximum current allowed by the choice of resistor 194.

"On-hook" coupled systems provide several embodiment alternatives in addition to AC coupled systems. As described in the discussion of FIG. 8, "on-hook" coupling may be used to provide a regulated voltage to the communications network. However, an embodiment could also allow a communications network biasing current sufficient to run modern microphones while maintaining an "off-hook" condition. For example, some telephone companies declare a subscriber loop "off-hook" if the current between the ring and tip lines 16 and 18 exceeds 6 mA while the embodiment shown in FIG. 9 can be chosen to operate with acceptable performance with an active DC current between the ring and tip lines 16 and 18 of less than 1.5 mA !

Figure 9:
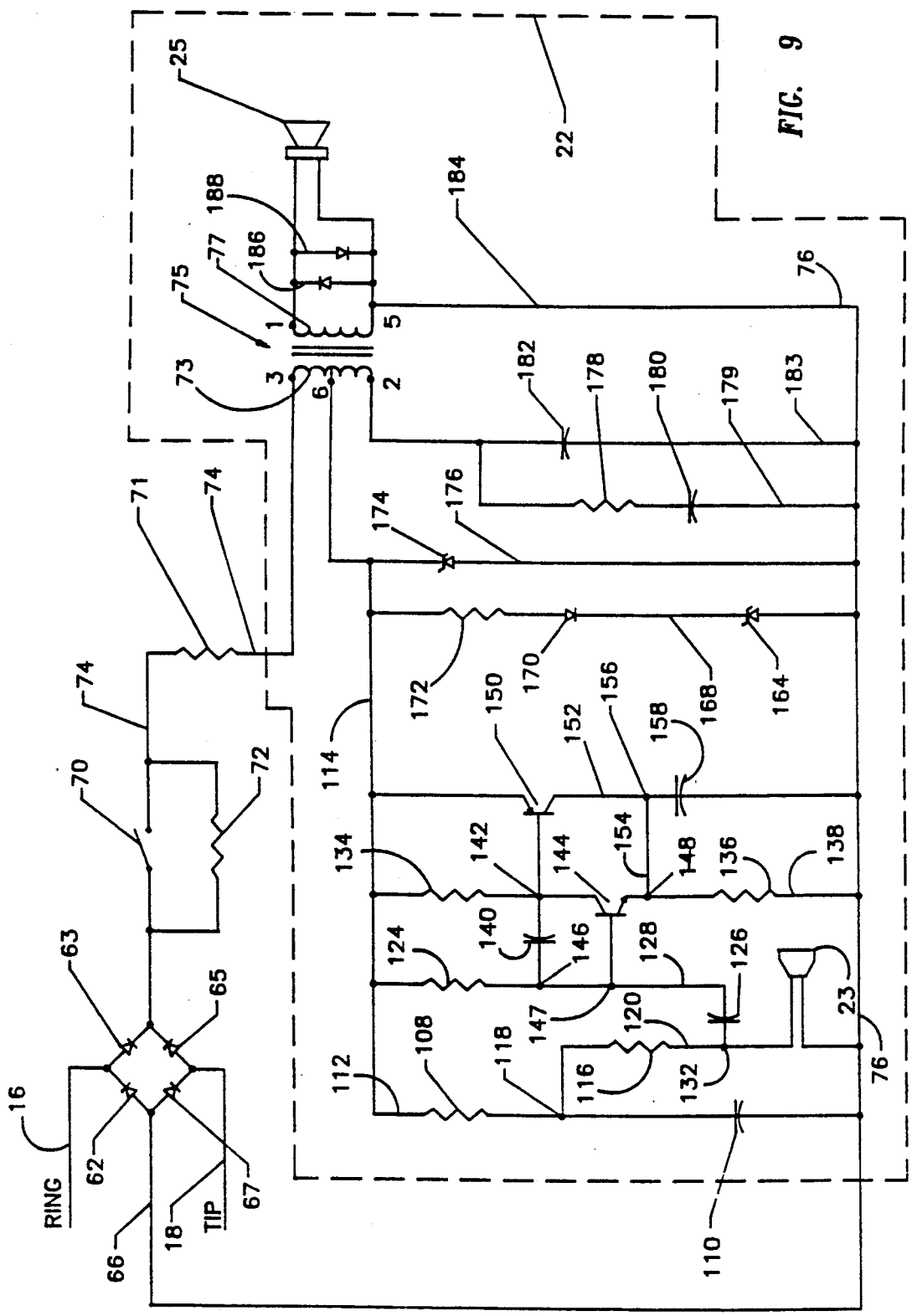
FIG. 9 is a schematic view of a conditionally operative telephone of the present invention which is "on-hook" coupled and line powered.

FIG. 9 is a modified version of a CONAIR Slimline telephone. All major components of the CONAIR Slimline telephone were removed except the communications network 22. Resistor 71 was used to replace a transistor network. An Electret microphone 23 of sufficient quality was used to allow the resistor 71 to be chosen high enough to maintain "on-hook" coupling while providing enough biasing current to allow acceptable performance. A diode bridge comprised of diodes 62, 63, 65 and 67 is connected to the input lines 16 and 18. The diode bridge is used to protect the circuit against reversed polarity of the ring and tip lines 16 and 18. Thus, the voltage of line 66 will always be the lowest voltage presented to the communications network 22. A switch 70 and resistor 72 are connected in a line 74 which connects to pin 3 of windings 73 of a transformer 75 through resistor 71. The switch 70 is closed when the telephone is active and open when it is not. Resistor 72 has a large resistance and is provided to allow the capacitors used in FIG. 9 to charge in order to prevent surges when the switch 70 is closed.

The microphone preamplifier circuit includes a resistor 108 and a capacitor 110 provided in a line 112 which connects between line 76 and a line 114 which is connected to pin 6 of transformer winding 73 of transformer 75. A resistor 116 is connected at a point 118 between resistor 112 and capacitor 110. Resistor 116 is in a line 120 which connects point 118 with the microphone 23. Resistors 108 and 116 are chosen so that the flow of current through the resistor 108, resistor 116 and the microphone 23 will establish a voltage across the microphone 23 which biases it into its desired operating condition. Capacitor 110 holds the voltage at junction point 118 stable.

The microphone amplifier circuit includes a resistor 124 and a capacitor 126 provided in a line 128 which is connected to line 114 and to a point 132 between resistor 116 and the microphone 23. The capacitor 126 provides AC coupling of the microphone preamplifier signal to the microphone amplifier. A pair of resistors 134 and 136 are connected in a line 138 which is provided between lines 114 and 76 and a capacitor 140 connects to a point 142 in line 138 and to a point 146 in line 128. A transistor 144 has its base connected to a point 147 in line 128, its collector connected to a point 142, and it emitter connected to a point 148 in line 138 A transistor 150 has its base connected to a point 142, and its emitter connected to line 114 and its collector connected, via line 152 to line 76. The emitter of transistor 144 and the collector of transistor 150 are connected by a line 154 which connects at point 148 and a point 156 in line 152. A capacitor 158 is connected in line 152 between point 156 and line 76. The path from line 114 through the emitter and collector of transistor 150 and through resistor 136 down to line 76 is the main DC biasing current path required for proper amplifier operation. Capacitor 158 provides an AC path for the quick modulation of the current flowing between line 114 and line 76.

The upper voltage limit for the amplifier is provided by a zener diode 174 in line 176 which connects between lines 114 and 76. Typically the zener diode 174 is chosen so as not to allow the voltage across lines 114 and 76 to exceed 15 volts. The lower operating voltage limit is provided by a resistor 172, a diode 170 and a zener diode 164 connected in a line 168 between lines 114 and 76. The zener diode 164 is chosen so that the lower operating voltage limit is greater than 5.7 volts. Thus, zener diodes 174 and 164 force the amplifier circuit to operate between 5.7 and 15 volts.

Connected in a line 179 which connects to pin 2 of winding 73 of transformer 75 and to line 76 is a resistor 178 and a capacitor 180. A capacitor 182 is provided in a line 183 connected to pin 2 and line 76. The capacitors 182 and 180 along with the resistor 178 provide an AC path for incoming communication signals.

A line 184 connects pin 5 of winding 77 of transformer 75 with line 76. A pair of diodes 186 and 188 are connected across the speaker 25 and pin 1 and 5 of winding 77 of transformer 75. These diodes protect the speaker by limiting the signal level presented to the speaker.

When the telephone is active the main current path is from the ring line 16 through the diode 63 into resistor 71, through resistor 71 into pin 3 of winding 73 of transformer 75, through pin 3 into winding 73, through winding 73 into pin 6, through pin 6 into the emitter of transistor 150, through transistor 150 into resistor 136, through resistor 136 into diode 67, through diode 67 and out the tip line 18. This current must not exceed the "on-hook" condition. Thus, resistor 71 must be large enough to prevent "off-hook" while allowing sufficient current flow for acceptable operation.

It should be noted that none of those embodiments of FIGS. 5, 6 and 9 allow the subscriber to prevent participation in a telephone call. As discussed earlier, it may not be desirable for children to participate in all adult conversations. Therefore, presentation and discussion of "dial controllable conditionally operative telephones" will begin with FIG. 10 and continue through FIG. 15.

Figure 10:
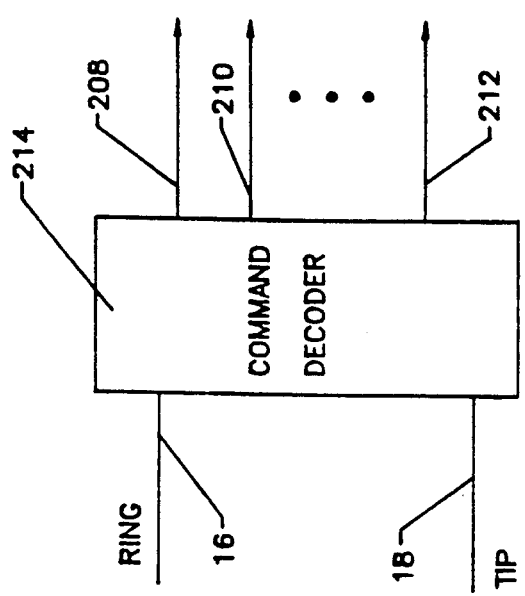
FIG. 10 is a block diagram illustrating the use of a command decoder in a conditionally operative telephone system of the present invention.

In order for a conditionally operative telephone to respond to commands generated from a standard telephone, the conditionally operative telephone must possess a means for receiving and interpreting data generated by a standard telephone. Thus, a command decoder will be provided in the conditionally operative telephone. Typically, this command decoder will be "on-hook" coupled to the subscriber loop. FIG. 10 is a block diagram illustration of the use of a command decoder 214. The input for the command decoder 214 is the ring and tip wires 16 and 18. The outputs are a plurality of control lines illustrated by lines 208, 210 and 212.

Figure 11:
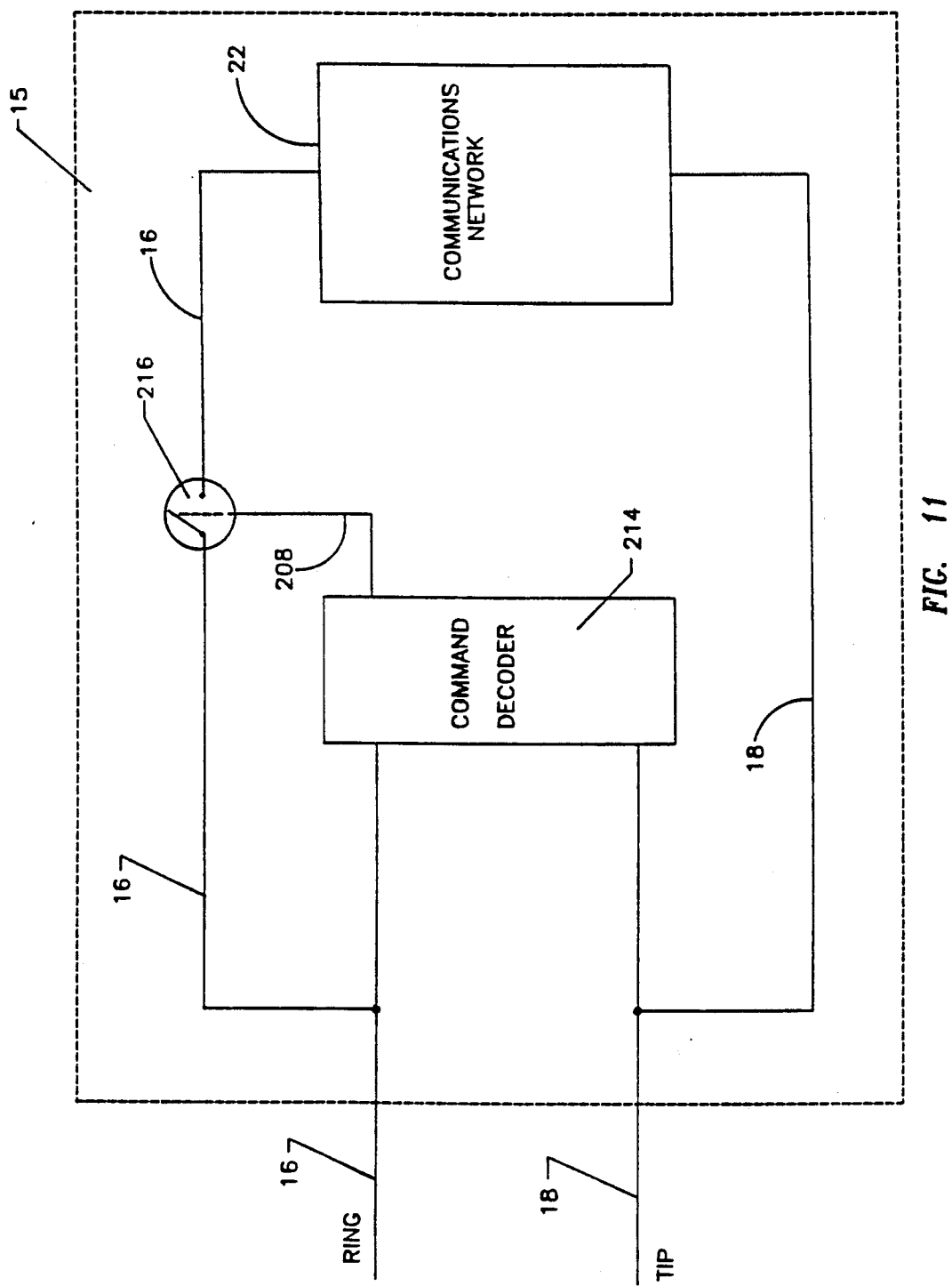
FIG. 11 is a block diagram illustrating a conditionally operative telephone utilizing a command decoder for disconnecting the communications network.

The disconnection of the communications network of a conditionally operative telephone would prevent the participation of the conditionally operative telephone in adult conversations. FIG. 11 illustrates a conditionally operative telephone 15 which possesses a means to allow a standard telephone to command the disconnection of the conditionally operative telephone's 15 communications network 22. The input of the command decoder 214 is the ring and tip wires 16 and 18. The output of the command decoder 214 is the control line 208. The communications network 22 is connected to the ring and tip lines 16 and 18. A switch 216 is connected in line 16 between the command decoder 214 and the communications network 22. The switch 216 is controlled by the control line 208. A predefined signal condition on control line 208 will close the switch 216. A different predefined signal condition on control line 208 will open switch 216. Thus, the command decoder 214 possesses a means to connect and disconnect the communications network 22.

Figure 12:
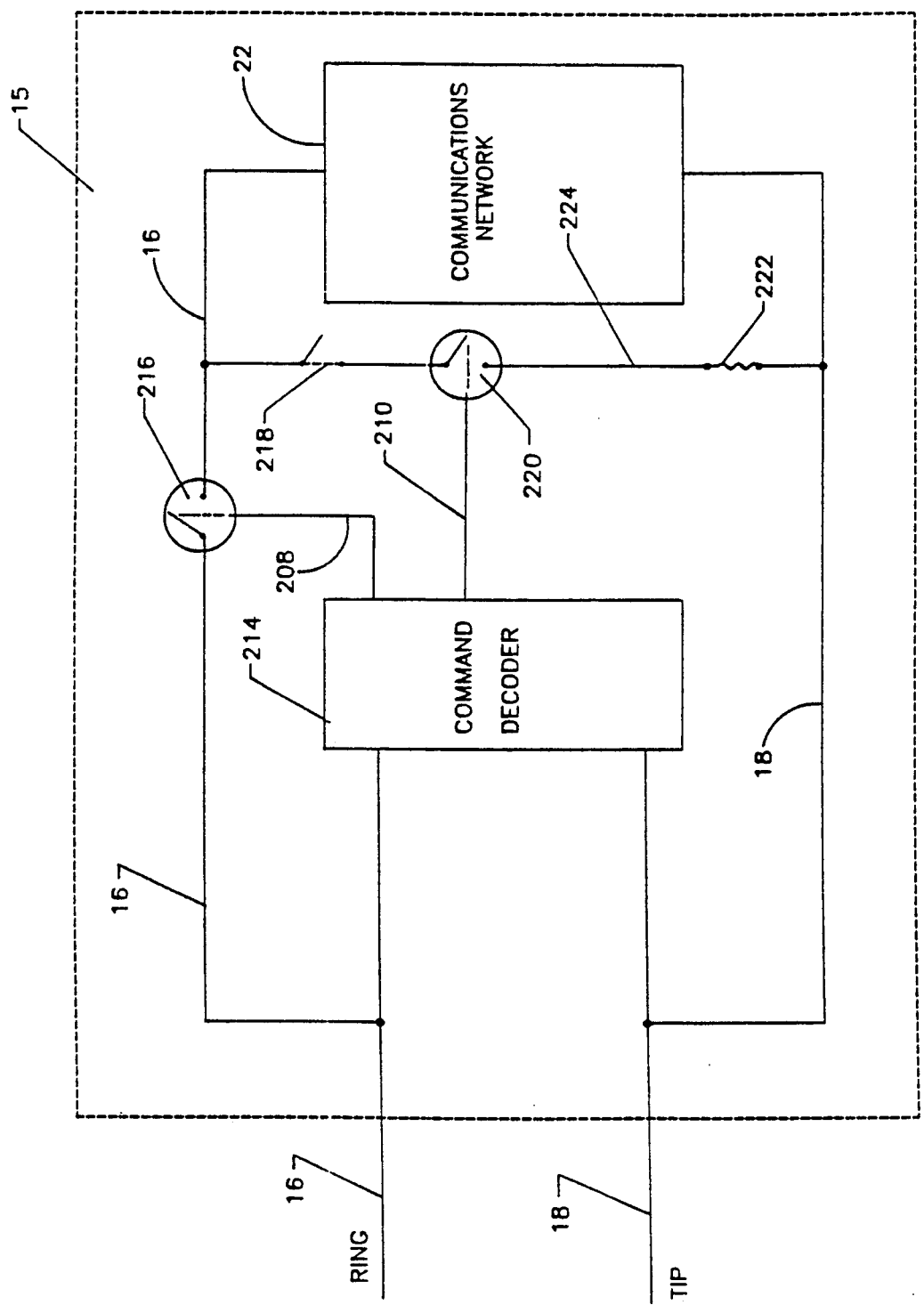
FIG. 12 is a block diagram similar to FIG. 11 having a controllable "off-hook means".

It may be desirable to allow the user of a conditionally operative telephone to complete a telephone call. This requires the conditionally operative telephone to possess an "off-hook" means. FIG. 12 illustrates the same conditionally operative telephone 15 shown in FIG. 11 with the addition of a controllable "off-hook" means. The "off-hook" means includes a switch hook 218, a switch 220 and a resistor 222 connected in a line 224. Line 224 connects to lines 16 and 18 between switch 216 and the communications network 22. Resistor 222 is chosen so that when switches 216, 218 and 220 are all closed a sufficiently large current will flow between the ring and tip lines 16 and 18 to place the subscriber loop into an "off-hook" condition. A predefined signal condition on control line 210 will close the switch 220. A different predefined signal condition on control line 210 will open the switch 220. The switch hook 218 is closed when the conditionally operative telephone 15 is active (e.g. handset is lifted) and open otherwise. Thus, the command decoder 214 possesses a means to allow the user of a conditionally operative telephone 15 to complete a telephone call.

Figure 13:
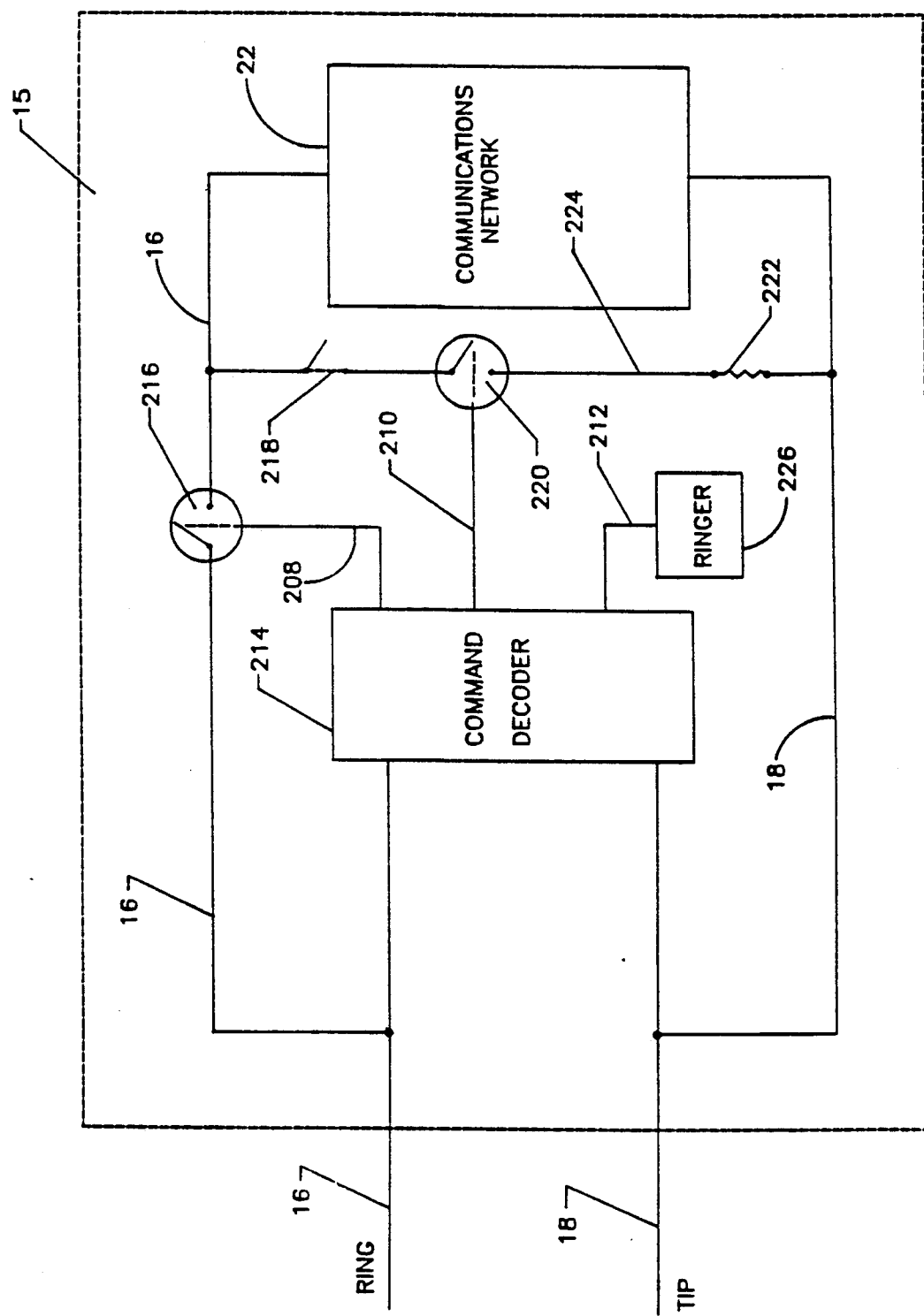
FIG. 13 is a block diagram similar to FIG. 12 with the addition of a controllable ringing means.

It may be desirable for the user of a standard telephone to "ring" a conditionally operative telephone. Obviously, a standard telephone does not possess the means to place a ringing signal upon its own subscriber loop. Thus, a command must be sent to "ring" the conditionally operative telephone. FIG. 13 illustrates the same conditionally operative telephone 15 shown in FIG. 12 with the addition of a controllable ringing means. The controllable ringing means includes a ringer 226 and a control line 212. A "ring" command implementation might be to periodically activate control line 212 after the reception of the "ring" command until the conditionally operative telephone 15 is activated (e.g. handset lifted) or until the reception of a "stop ringing" command. Another "ring" command implementation might be to activate control line 212 only for one short time duration after the reception of each "ring" command.

Figure 14:
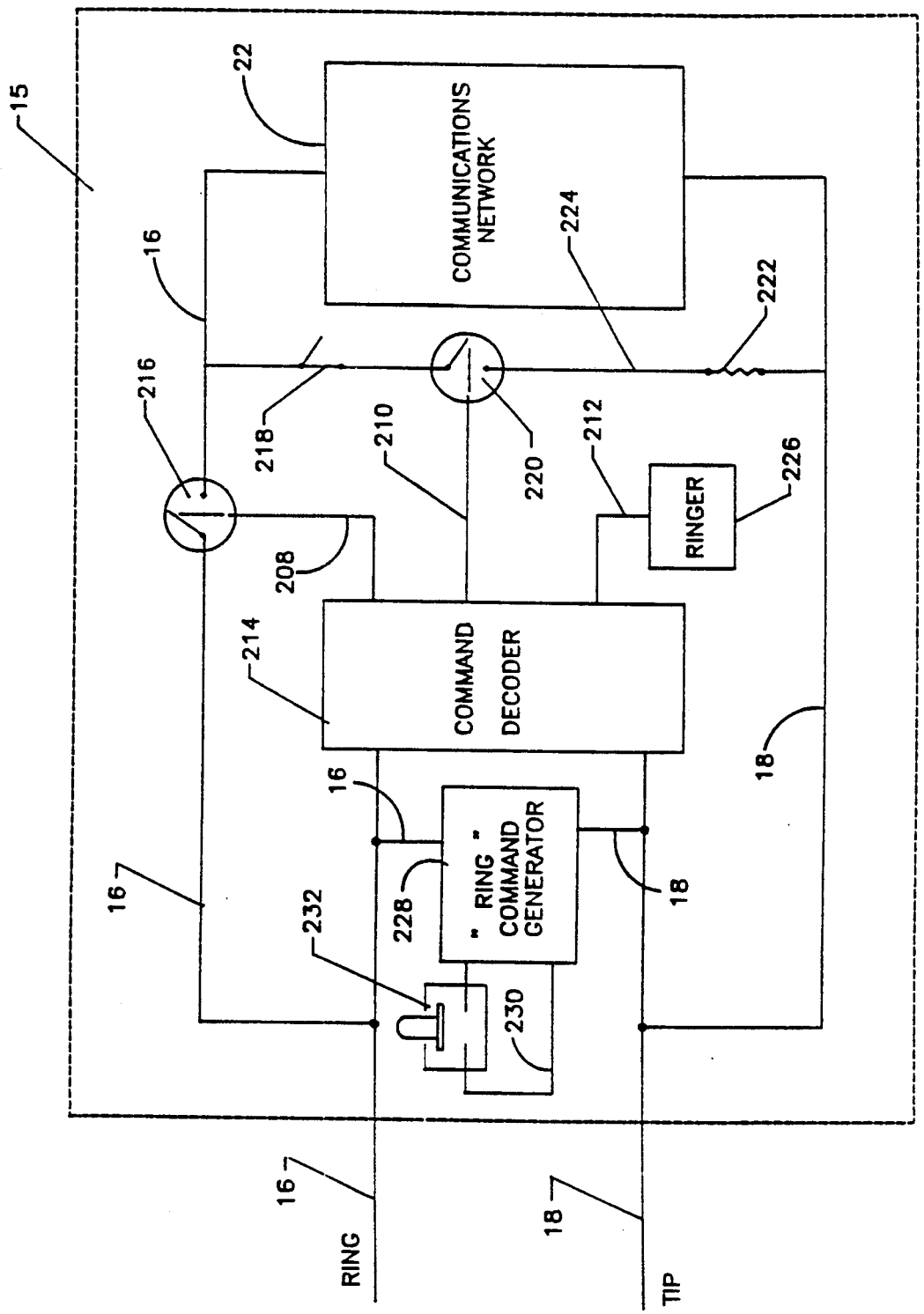
FIG. 14 is a block diagram similar to FIG. 13 with the addition of a send "ring" command means.

It may also be desirable for the user of a conditionally operative telephone to "ring" another conditionally operative telephone since "on-hook" coupled devices can communicate as interhome intercoms. FIG. 14 illustrates the same conditionally operative telephone 15 shown in FIG. 13 with the addition of a send "ring" command means. The send "ring" command means includes a "ring" command generator 228 connected to a switch 232 through a line 230. The "ring" command generator is connected across the ring and tip lines 16 and 18. When the push button switch 232 is closed the "ring" command generator 228 will place the "ring" command upon the subscriber loop.

It is not an objective of this invention to exhaustively present and discuss the enormously possible command format definitions. One embodiment might define the commands as a predetermined sequence of Touch Tone signals. Another might use a sequence of make-break pulses. Still another, might require that additional conditions be satisfied for the implementation of some commands. These additional conditions might, for example, be related to elapsed time or time of day requirements. For the purpose of illustration only, the following Touch Tone signal command format definitions will be used.

"##": Allow "off-hook" maintenance
"**": Disconnect communications network
"#*": Connect communications network
"*#": Ring conditionally operative telephone The conditionally operative telephone 15 shown in FIG. 14 may have many different configurations and the conditionally operative telephone 15 of FIG. 15 is illustrative of one such configuration.

Figure 15:
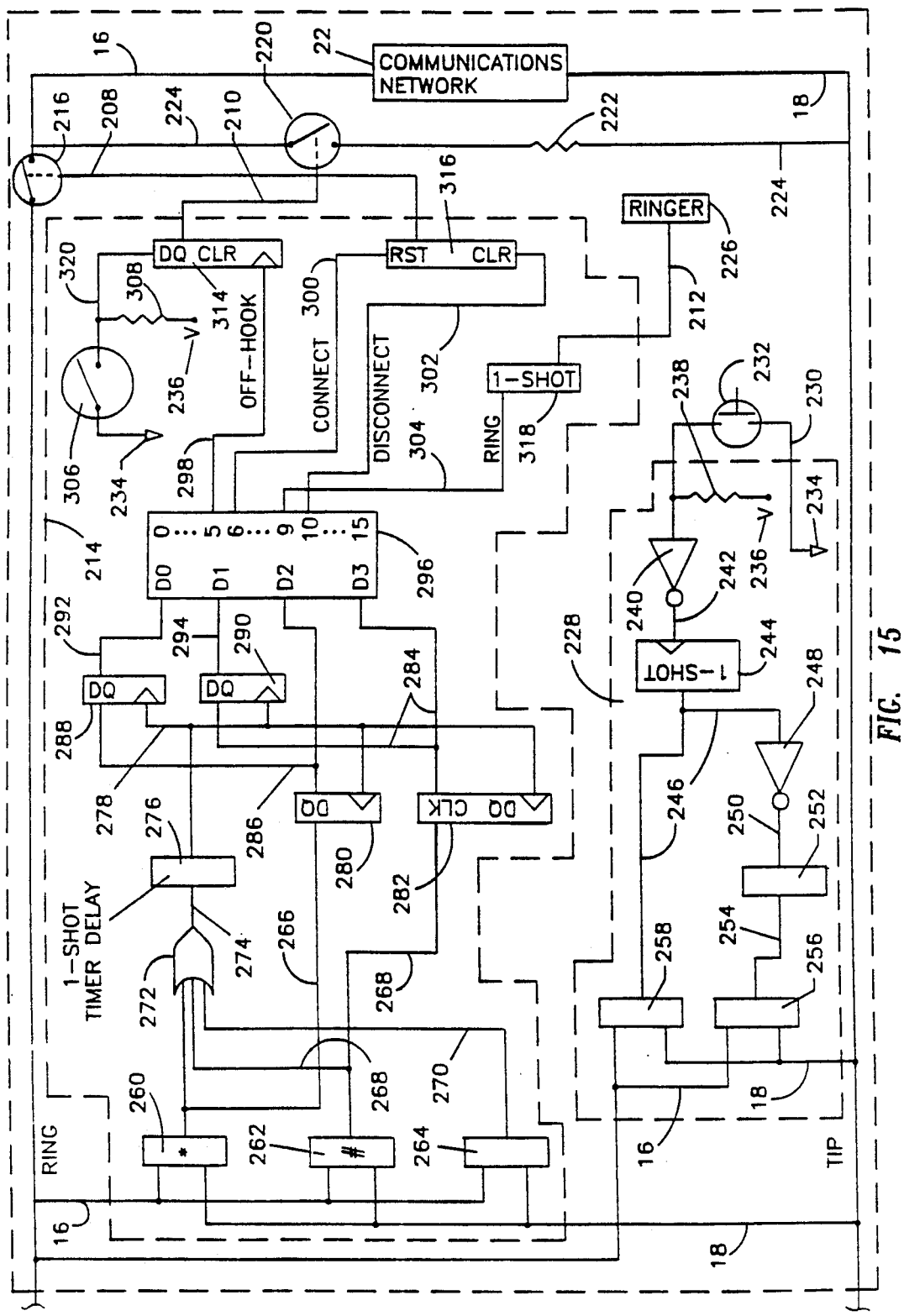
FIG. 15 is a schematic illustration of a conditionally operative telephone implementation of FIG. 14.

FIG. 15 illustrates one embodiment of the conditionally operative telephone 15 shown in block diagram form in FIG. 14. The "ring" command generator 228 includes a push button switch 232 connected in a line 230 which connects the ground 234 to an inverter 240 and a pull up resistor 238. Resistor 238 is also connected to the positive reference voltage "V" 236. The inverter 240 output is connected to the rising edge triggered one-shot timer 244 by a line 242. The output of the rising edge triggered one-shot timer 244 is connected to the input of both an inverter 248 and the "*" tone generator 258. The output of the inverter 248 is connected to the input of a rising edge one-shot timer 252 by line 250. The output of the rising edge on-shot timer 252 is connected to the input of the "#" tone generator 256 by line 254. The outputs of the "*" tone generator 258 and the "#" tone generator 256 are connected to the ring and tip lines 16 and 18.

The push button switch 232 is normally open. When a user desires to send a "ring" command, the push button switch 232 is closed. When the push button switch 232 is closed the input to the inverter 240 goes from high to low. Thus the output of the inverter 240 goes from low to high. This low to high transition presented to the input of the rising edge one-shot timer 244 activates the timer. Due to the detection of a rising edge the output of the one-shot timer 244 will become high and remain high for a predetermined time duration. This will present a high state to the input of the "*" tone generator 258 thus causing it to place a "*" tone signal on the ring and tip lines 16 and 18. The output of the inverter 248 will become low due to the presence of a high on its input. When the one-shot timer 244 allows its output to return to low, the "*" tone generator will stop producing the "*" tone, and the rising edge one-shot timer 252 will become active for a pre-determined time duration due to a low to high transition from the output of inverter 248. Thus, the "#" tone generator will place a "#" tone signal on the ring and tip lines 16 and 18. When the predetermined time duration is complete the output of the one-shot timer 252 will return to low. Thus the "#" tone generator 256 will stop producing the "#" tone signal. Therefore, by pushing the push button switch 232 the user can place a "*#" tone sequence on the subscriber loop.

The command decoder 214 includes a "*" tone detector 260, a "#" tone detector 262 and an other tone detector 264 all of whose inputs are connected to the ring and tip lines 16 and 18. The output of the "*" tone detector 260 is connected to the input of a "D" flip-flop 280 and the OR gate 272 by a line 266. The output of the "#" tone detector 262 is connected to the input of a "D" flip-flop 282 and the OR gate 272 by a line 268. The output of the other tone detector 264 is connected to the input of the OR gate 272 by a line 270. The output of the OR gate 272 is connected to the input of a one-shot delay timer 276 by line 274. The output of the one-shot delay timer 276 is connected to the CLK inputs of "D" flip-flops 280, 282, 288 and 290 by line 278. The output of "D" flip-flop 280 is connected to the D2 input of the 4-to-16 decoder 296 and the input of "D" flip-flop 288 by line 286. The output of "D" flip-flop 282 is connected to the D3 input of the 4-to-16 decoder 296 and the input of "D" flip-flop 290 by line 284. The output of "D" flip-flop 288 is connected to the D0 input of the 4-to-16 decoder 296. The output of the "D" flip-flop 290 is connected the D1 input of the 4-to-16 decoder 296 by line 294. Output number 5 (labeled as "Off-hook") of the 4-to-16 decoder 296 is connected to the CLK input of the "D" flip-flop 314 by a line 298. Output number 6 (labeled as "Connect") of the 4-to-16 decoder 296 is connected to the RST input of a flip-flop 316. Output number 9 (labeled as "Ring") of the 4-to-16 decoder 296 is connected to the input of a one-shot timer 318. Output number 10 (labeled as "Disconnect") of the 4-to-16 decoder 296 is connected to the CLR input of a flip-flop 316. A switch hook 306 is connected in a line 320 between the ground 234 and a pull up resistor 308. The pull up resistor 308 is connected to the reference voltage "V" 236. Line 320 is also connected to the CLR input of a "D" flip-flop 314. The D input of a "D" flip-flop 314 is connected to the reference voltage "V" 236 through a pull up resistor 322. The output of the "D" flip-flop 314 is connected to the control input of switch 220 by control line 210. The output of flip-flop 316 is connected to the control input of switch 216 by line 208. The output of the one-shot timer 318 is connected to the control input of the ringer 226 by a line 212. Switch 220 and resistor 222 are connected in a line 224 across line 16 and 18. The communications network 22 is also connected across lines 16 and 18.

When a defined Touch Tone signal is present on the subscriber loop, one of the tone detectors will be activated. If the tone is a "*" then a high will be presented to the OR gate 272 and the D input of the "D" flip-flop 280. The input of the one-shot delay timer 276 will become high due to the high presented in the input of the OR gate 272. The output of the one-shot delay timer 276 will go high after a short predetermined time delay. This will clock the "D" flip-flops 280, 282, 288 and 290. The D2 and D3 inputs of the 4-to-16 decoder 296 will thus be "10". The previous outputs of the "D" flip-flops 280 and 282 are also clocked into the inputs of the "D" flip-flops 288 and 290. Thus the current digit is presented to the D2 and D3 inputs and the previous digit is presented to the D0 and D1 inputs of the 4-to-16 decoder 296. If the tone is a "#" then the code transmitted will be a "01". If the tone is a Touch Tone signal other than a "*" or a "#" then the code transmitted will be a "00".

A "*#" sequence will present a "1001" to the input of the 4-to-16 decoder 296. This will activate output 9 (labeled "Ring") of the 4-to-16 decoder 296. This will cause the one-shot timer 318 to become high and remain high for a predetermined time. This will activate the ringer 226 for the said predetermined time.

A "#*" sequence will present a "0110" to the input of the 4-to-16 decoder 296. This will activate output 6 (labeled "Connect") of the 4-to-16 decoder 296. Since the connect signal is connected to the RST input of the flip-flop 316 the control line 208 will become high and remain high until an active signal is presented to the CLR input of the flip-flop 316. This will cause switch 216 to close and thus connect the communications network 22 to the subscriber loop. A "**" sequence will present a "1010" to the input of the 4-to-16 decoder 296. This will activate output 10 (labeled "Disconnect") of the 4-to-16 decoder 296. Since the disconnect signal is connected to the CLR input of the flip-flop 316 the control line 208 will become low and remain low until an active signal is presented to the RST input of the flip-flop 316. This will cause switch 216 to open and thus disconnect the communications network 22 from the subscriber loop.

A "##" sequence will present a "0101" to the input of the 4-to-16 decoder 296. This will activate output 5 (labeled "off-hook") of the 4-to-16 decoder 296 which will clock a high into the "D" flip-flop 314 providing switch hook 306 is open. This high will activate the control input of switch 220 thus closing the switch. Resistor 222 is chosen so that when switches 216 and 220 are closed sufficient current will flow between the ring and tip lines 16 and 18 to establish the subscriber loop has "off-hook". Thus "off-hook" maintenance will be allowed until switch hook 306 is closed which will clear the "D" flip-flop 314 thus opening switch 220.

Obviously, numerous modifications and variations of the present invention are possible in light of the above teachings. It is therefore to be understood that within the scope of the appended claims the invention may be practiced otherwise than as specifically described herein.

I claim:

1. A dial conditionally operative telephone device for direct connection to only a subscriber loop, said conditionally operative telephone device comprising:

connecting mean for directly connecting said dial controllable conditionally operative telephone to only said telephone subscriber loop using the ring and tip lines of said subscriber loop;

communications means disposed for reception and/or transmission of communications over said subscriber loop;

command decoder means for receiving authorization signal transmitted on said subscriber loop to permit discrete functional capabilities of said dial controllable conditionally operative telephone; and, command implementation means for implementing said functional capabilities.

2. A telephone device as set forth in claim 1 wherein said command decoder includes a Touch Tone decoder.

3. A telephone device as set forth in claim 1 wherein said command decoder includes a make/break pulse decoder.

4. A telephone device as set forth in claim 1 wherein said implementation means includes a connect/disconnect means to permit said dial controllable conditionally operative telephone device to be connected to and from said subscriber loop.

5. A device as set forth in claim 1 wherein said implementation means includes connect/disconnect means for connecting a sufficiently small load across said ring and tip lines of said subscriber so as to allow said dial controllable conditionally operative device to place and maintain said subscriber loop in an "off-hook" conditions.

6. A telephone device as set forth in claim 1 wherein said implementation means includes ringer means for permitting ringing of said dial controllable conditionally operative telephone device.

7. A telephone device as set forth in claim 1 including command generation means to permit transmission of electrical signals which indicate allowed conditions of selected said functional capabilities in said conditionally operative telephone device.

8. A telephone device as set forth in claim 7 wherein said command generator includes a ring command generator to transmit ring command signals.

9. A telephone device as set forth in claim 8 including a manually operated push-button switch to activate said ring command generator.

10. A telephone device as set forth in claim 1 including "on-hook" coupling means to permit said subscriber loop to remain in an "on-hook" status and thus capable of allowing a connected standard telephone to function even while said conditionally operative telephone is active.

11. A telephone device as set forth in claim 1 including "off-hook" status only under certain predetermined conditions.

12. A telephone device as set forth in claim 11 which includes "on-hook" coupling means to achieve said "off-hook"restriction function.

13. A telephone device as set forth in claim 11 including connect/disconnect means to achieve said "off-hook" restriction function.

14. A telephone device as set forth in claim 1 including dial prevention means to permit said dial controllable conditionally operative telephone device to execute a dialing function only under certain predetermined conditions;

15. A telephone device as set forth in claim 14 including "on-hook" coupling means to achieve said dial prevention function.

16. A telephone device as set forth in claim 14 including connect/disconnect means to achieve said dial prevention function.

17. A telephone device as set forth in claim 1 including electrical signal sound reception restriction means for permitting said dial controllable conditionally operative telephone device to receive electrical signals from said subscriber loop for presentation to a user in an acceptable format only under certain predetermined conditions.

18. A telephone device as set forth in claim 17 including connect/disconnect means to achieve said sound reception restriction function.

19. A device as set forth in claim 7 including electrical signal sound transmission restriction means to allow transmission of said electrical signals onto said subscriber loop only under certain predetermined conditions.

20. A telephone device as set forth in claim 19 including connect/disconnect means to achieve said sound transmission restriction function.

21. A telephone device as set forth in claim 1 including answer prevention means to prevent said dial controllable conditionally operative telephone device from answering a telephone call except under certain predetermined conditions.

22. A telephone device as set forth in claim 21 including "on-hook" coupling means to achieve said answer prevention function.

23. A telephone device as set forth in claim 1 including call maintenance prevention means to permit said dial controllable conditionally operative device to maintain an external call only under predetermined conditions.

24. A telephone device as set forth in claim 23 including "on-hook" coupling means to achieve said call maintenance prevention function.

25. A telephone device as set forth in claim 23 including connect/disconnect means to achieve said call maintenance prevention function.

* * * * *